(12) United States Patent
Mizutani et al.

(10) Patent No.: US 11,018,374 B2
(45) Date of Patent: May 25, 2021

(54) ALL-SOLID-STATE BATTERY

(71) Applicant: TOYOTA JIDOSHA KABUSHIKI KAISHA, Toyota (JP)

(72) Inventors: Satoshi Mizutani, Numazu (JP); Yuhki Yui, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 16/353,615

(22) Filed: Mar. 14, 2019

(65) Prior Publication Data

US 2019/0305368 A1 Oct. 3, 2019

(30) Foreign Application Priority Data

Apr. 3, 2018 (JP) .............................. JP2018-071868

(51) Int. Cl.
*H01M 4/62* (2006.01)
*H01M 4/38* (2006.01)
*H01M 10/0562* (2010.01)
*H01M 10/0525* (2010.01)
*H01M 4/02* (2006.01)

(52) U.S. Cl.
CPC ....... *H01M 10/0562* (2013.01); *H01M 4/386* (2013.01); *H01M 4/625* (2013.01); *H01M 10/0525* (2013.01); *H01M 2004/027* (2013.01); *H01M 2300/002* (2013.01)

(58) Field of Classification Search
CPC .......... H01M 4/62; H01M 4/38; H01M 4/131; H01M 10/0562; H01M 10/0525
See application file for complete search history.

(56) References Cited

FOREIGN PATENT DOCUMENTS

| JP | 2013-016280 A | 1/2013 |
| JP | 2013-069416 A | 4/2013 |
| JP | 2014-192093 A | 10/2014 |
| JP | 2017-054720 A | 3/2017 |
| JP | 2017-059534 A | 3/2017 |

OTHER PUBLICATIONS

Machine Translation of: JP 2017/054720 Mitzutani, Mar. 16, 2017.*

* cited by examiner

*Primary Examiner* — Kenneth J Douyette
(74) *Attorney, Agent, or Firm* — Oliff PLC

(57) ABSTRACT

An all-solid-state battery which includes an anode layer that contains a Si-based material as an anode active material and which has high energy density. Provided is an all-solid-state battery including a cathode layer, an anode layer, and a solid electrolyte layer disposed between the cathode layer and the anode layer, wherein the anode layer includes an anode active material that contains at least one Si-based material selected from the group consisting of Si and a Si alloy, and a solid electrolyte that contains a sulfide-based solid electrolyte; wherein a void surrounded by the solid electrolyte is present in at least a region formed by the solid electrolyte in the anode layer; and wherein, when a total volume of the anode layer is determined as 100 vol %, a percentage of the voids surrounded by the solid electrolyte in the anode layer, is 3.4 vol % or more and 29.6 vol % or less.

7 Claims, 1 Drawing Sheet

ALL-SOLID-STATE BATTERY

TECHNICAL FIELD

The disclosure relates to an all-solid-state battery.

BACKGROUND

In recent years, with the rapid spread of IT and communication devices such as personal computers, camcorders and cellular phones, great importance has been attached to the development of batteries that can be used as the power source of such devices. In the automobile industry, etc., high-power and high-capacity batteries for electric vehicles and hybrid vehicles are under development.

Of all-solid-state batteries, a lithium ion all-solid-state battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

An active material comprising a Si-based material has a large theoretical capacity per volume. Accordingly, a lithium ion all-solid-state battery in which a Si-based material is used as the anode, has been proposed.

In Patent Literatures 1 to 3, all-solid-state batteries in which Si is used as the anode active material, are disclosed.

In Patent Literature 4, the percentage of voids in a solid electrolyte layer is disclosed, which is aimed at increasing the discharge capacity of a non-aqueous electrolyte battery.

Patent Literature 5 discloses a void in an anode for all-solid-state batteries, which is a space surrounded by a sulfide solid electrolyte and/or an anode active material. Patent Literature 5 also discloses that the percentage of voids in the anode is from 5% to 30%. In Patent Literature 5, Si and a carbonaceous material are integrated and used as the anode active material. Therefore, there is no description of a void in a solid electrolyte contained in the anode.

Patent Literature 1: Japanese Patent Application Laid-Open (JP-A) No. 2014-192093
Patent Literature 2: JP-A No. 2013-069416
Patent Literature 3: JP-A No. 2017-059534
Patent Literature 4: JP-A No. 2013-016280
Patent Literature 5: JP-A No. 2017-054720

In the case of an all-solid-state battery comprising an anode layer that contains a Si-based material as an anode active material, the anode active material shows a large volume expansion rate during battery charging. Therefore, the all-solid-state battery has a problem in that a jig is needed to suppress battery swelling, and the energy density of the battery decreases.

To suppress battery swelling, the number of voids in the anode layer can be increased. However, in this case, there is a problem in that it may be difficult to ensure contact between the anode active material and the solid electrolyte, and an increase in battery resistance may occur.

SUMMARY

In light of the above circumstance, an object of the present disclosure is to provide an all-solid-state battery which comprises an anode layer that contains a Si-based material as an anode active material and which has high energy density.

In a first embodiment, there is provided an all-solid-state battery comprising a cathode layer, an anode layer, and a solid electrolyte layer disposed between the cathode layer and the anode layer, wherein the anode layer comprises an anode active material that contains at least one Si-based material selected from the group consisting of Si and a Si alloy, and a solid electrolyte that contains a sulfide-based solid electrolyte; wherein a void surrounded by the solid electrolyte is present in at least a region formed by the solid electrolyte in the anode layer; and wherein, when a total volume of the anode layer is determined as 100 vol %, a percentage of the voids surrounded by the solid electrolyte in the anode layer, is 3.4 vol % or more and 29.6 vol % or less.

The anode layer may further comprise a fibrous carbon as a conductive material.

When the total volume of the anode layer is determined as 100 vol %, a percentage of all voids present in the anode layer, may be 5 vol % or more and 38 vol % or less.

When a total volume of the region formed by the solid electrolyte in the anode layer is determined as 100 vol %, a percentage of the voids surrounded by the solid electrolyte in the region, may be 40 vol % or more and 80 vol % or less.

According to the disclosed embodiments, an all-solid-state battery which comprises an anode layer that contains a Si-based material as an anode active material and which has high energy density, is provided.

BRIEF DESCRIPTION OF THE DRAWINGS

In the accompanying drawings.

DETAILED DESCRIPTION

Figure 1:
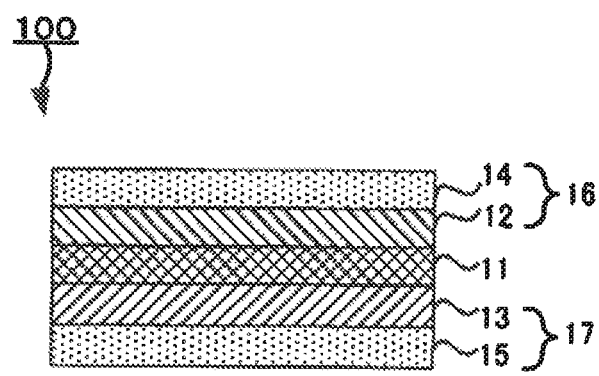
FIG. 1 is a schematic sectional view of an example of the all-solid-state battery according to the disclosed embodiments.

The all-solid-state battery according to the disclosed embodiments is an all-solid-state battery comprising a cathode layer, an anode layer, and a solid electrolyte layer disposed between the cathode layer and the anode layer, wherein the anode layer comprises an anode active material that contains at least one Si-based material selected from the group consisting of Si and a Si alloy, and a solid electrolyte that contains a sulfide-based solid electrolyte; wherein a void surrounded by the solid electrolyte is present in at least a region formed by the solid electrolyte in the anode layer; and wherein, when a total volume of the anode layer is determined as 100 vol %, a percentage of the voids surrounded by the solid electrolyte in the anode layer, is 3.4 vol % or more and 29.6 vol % or less.

Si has larger capacity than a carbonaceous material. On the other hand, when Si is reacted with Li, it undergoes a very large volume change and the volume expands 3 to 4 times.

In a battery comprising a solid electrolyte, Li conduction is carried out by the solid electrolyte (SE) disposed around an active material.

When the number of voids in the anode layer is decreased as much as possible in order to keep a sufficient contact area between the solid electrolyte and the anode active material, during volume expansion of the Si which is associated with a reaction with the Li and the resulting intercalation of the Li into the Si, there is no space allowed for the expanded Si.

Due to the expansion of the anode layer, a pressure applied to a confining jig increases. When a sufficiently strong confining jig is used to solve the problem, an excessive volume is added to the battery volume, and the energy density of the battery as a whole system is not increased.

Meanwhile, the pressure increase can be suppressed by increasing the percentage of the voids in the anode layer. However, the contact area between the solid electrolyte and the anode active material decreases, and the resistance value of the battery when the battery is discharged (when the active material shrinks) increases.

Accordingly, there is a problem in that it is difficult to achieve both relaxing the confining pressure of the battery and decreasing the resistance value of the battery.

By densely disposing the solid electrolyte around the anode active material and leaving the total percentage of the voids in the anode layer unchanged, the volume of the voids in the region formed by the solid electrolyte (i.e., the number of the voids surrounded by the solid electrolyte) is increased. Therefore, the expansion of the anode active material during battery charging, is easily absorbed. As a result, an increase in the confining pressure is suppressed, and the contact (interface) between the anode active material and the solid electrolyte is increased, whereby the resistance value of the battery can be decreased. That is, both suppressing an increase in the confining pressure and decreasing the resistance value of the battery can be achieved.

The interface between the anode active material and the solid electrolyte is decreased just by disposing the voids in the anode layer; therefore, the battery resistance increases. Meanwhile, it is presumed that an increase in the battery resistance and an increase in the confining pressure applied by the jig during battery charging, can be suppressed by disposing the solid electrolyte around the anode active material and then increasing the volume of the voids in the region formed by the solid electrolyte.

According to the disclosed embodiments, by disposing the voids in the region formed by the solid electrolyte in the anode layer (i.e., the voids surrounded by the solid electrolyte), the expansion of the anode active material can be suppressed during battery charging. Therefore, the number of jigs for suppressing battery swelling can be decreased, and a decreasing the energy density of the battery can be suppressed.

The voids surrounded by the solid electrolyte are disposed in a region surrounded by the solid electrolyte in the region formed by the solid electrolyte in the anode layer. Therefore, the contact (interface) between the anode active material and the solid electrolyte can be sufficiently ensured, so that an increase in the battery resistance can be suppressed.

In the disclosed embodiments, the "region formed by the solid electrolyte in the anode layer" (hereinafter it may be referred to as "solid electrolyte region") is a region in which the solid electrolyte is contained and the particles of the solid electrolyte are in contact with and connected to each other. More specifically, when the anode layer contains the anode active material, the solid electrolyte and other material, the solid electrolyte region is a region in the anode layer, in which the anode active material and other material are not present. The number of such a solid electrolyte region present in the anode layer is at least one, and it may be two or more.

In the disclosed embodiments, the void surrounded by the solid electrolyte is a void present in the region surrounded by the solid electrolyte in the region formed by the solid electrolyte in the anode layer. More specifically, it is a void resulting from contact of the solid electrolyte particles in the anode layer, and it is a void other than those such as (1) a void between the anode active material and the solid electrolyte, which is a void resulting from contact of the solid electrolyte with a material constituting the anode layer (e.g., the anode active material) and (2) a void surrounded by the active material, which is a void resulting from contact of the particles of the anode active material.

FIG. 1 is a schematic sectional view of an example of the all-solid-state battery according to the disclosed embodiments.

As shown in FIG. 1, an all-solid-state battery 100 comprises: a cathode 16 comprising a cathode layer 12 and a cathode current collector 14; an anode 17 comprising an anode layer 13 and an anode current collector 15; and a solid electrolyte layer 11 disposed between the cathode 16 and the anode 17.

Figure 2:
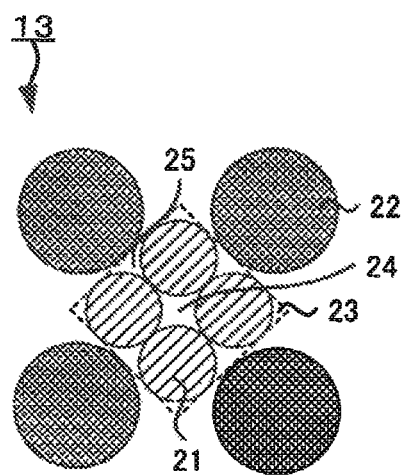
FIG. 2 is a schematic view of an example of an anode layer used in the disclosed embodiments.

FIG. 2 is a schematic view of an example of an anode layer used in the disclosed embodiments.

As shown in FIG. 2, solid electrolyte particles 21 and anode active material particles 22 are present in the anode layer 13. Also in FIG. 2, a region indicated by a dashed line is a solid electrolyte region 23. Accordingly, the solid electrolyte region 23 is a region in the anode layer 13, in which the anode active material particles 22 are not contained. In the solid electrolyte region 23, a void 24 is present, which is surrounded only by the solid electrolyte particles 21. Also in the anode layer 13, voids 25 may be present between the anode active material and the solid electrolyte, which are voids surrounded by the solid electrolyte particles 21 and the anode active material particles 22.

The anode comprises at least the anode layer. As needed, it further comprises an anode current collector.

The anode layer comprises at least a sulfide-based solid electrolyte and an anode active material. As needed, it comprises a conductive material and a binder.

As the anode active material, examples include, but are not limited to, at least one Si-based material selected from the group consisting of Si and a Si alloy. As the Si alloy, examples include, but are not limited to, an alloy with a metal such as Li, and an alloy with at least one metal selected from the group consisting of Sn, Ge and Al.

By assembling the all-solid-state battery and initially charging the same, the Si is reacted with a metal such as Li to form an amorphous alloy. An alloyed part of the Si is kept amorphized even after metal ions such as lithium ions are released by discharging the battery. In the disclosed embodiments, therefore, the anode layer comprising Si include such an embodiment that the Si is formed into amorphous alloy.

The form of the anode active material is not particularly limited. As the form, examples include, but are not limited to, a particulate form and a plate form.

For the anode active material particles, the average particle diameter (median diameter D50 of volume distribution) may be 10 μm or less, may be 5 μm or less, or may be 3 μm or less.

In the disclosed embodiments, the average particle diameter of particles is a value measured by laser diffraction/scattering particle size distribution analysis. Also in the disclosed embodiments, the median diameter is a diameter at which, when the particle diameters of particles are arranged in ascending order, the accumulated volume of the particles is half (50%) the total volume of the particles.

The content of the anode active material in the anode layer is not particularly limited. For example, when the total volume of the anode layer is determined as 100 vol %, the content of the anode active material may be from 20 vol % to 90 vol %.

The solid electrolyte used in the anode layer may be at least a sulfide-based solid electrolyte.

As the sulfide-based solid electrolyte, examples include, but are not limited to, $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $LiI$—$Li_2O$—$Li_2S$—$P_2S_5$, $LiBr$—$LiI$—$Li_2S$—$P_2S_5$, $Li_2S$—$P_2S_5$—$GeS_2$, and $Li_2S$—$P_2S_5$.

More specifically, examples include, but are not limited to, $Li_{10}GeP_2S_{12}$, $Li_8P_2S_9$, $15LiBr.10LiI.75(0.75Li_2S.0.25P_2S_5)$ and $70(0.06Li_2O.0.69Li_2S.0.25P_2S_5).30LiI$. The solid electrolyte may be one kind of solid electrolyte or two or more kinds of solid electrolytes.

Also, the solid electrolyte may be a crystalline, amorphous or glass-ceramic solid electrolyte.

The form of the solid electrolyte is not particularly limited. As the form, examples include, but are not limited to, a particulate form and a plate form. The solid electrolyte may be in a particulate form.

The content of the solid electrolyte in the anode layer is not particularly limited. For example, when the total volume of the anode layer is determined as 100 vol %, the content of the solid electrolyte may be from 10 vol % to 80 vol %.

[Percentage of Voids]

In the anode layer of the disclosed embodiments, a void surrounded by the solid electrolyte is present in at least a region formed by the solid electrolyte, and when the total volume of the anode layer is determined as 100 vol %, the percentage of the voids surrounded by the solid electrolyte in the anode layer, is 3.4 vol % or more and 29.6 vol % or less. From the viewpoint of an excellent balance between a battery resistance decreasing effect and a confining pressure decreasing effect, the lower limit of the percentage of the voids may be 8.3 vol % or more.

Also when the total volume of the anode layer is determined as 100 vol %, the percentage of all voids present in the anode layer may be 5 vol % or more and 38 vol % or less. From the viewpoint of an excellent balance between the battery resistance decreasing effect and the confining pressure decreasing effect, the lower limit may be 15 vol % or more. As used herein, "all voids present in the anode layer" are voids including not only the voids surrounded by the solid electrolyte, but also other voids such as the voids surrounded by the active material and the voids between the active material and the solid electrolyte.

Also, when the total volume of the region formed by the solid electrolyte and contained in the anode layer is determined as 100 vol %, the percentage of the voids surrounded by the solid electrolyte in the region, may be 40 vol % or more and 80 vol % or less. From the viewpoint of an excellent balance between the battery resistance decreasing effect and the confining pressure decreasing effect, the lower limit may be 52 vol % or more.

In the disclosed embodiments, the percentage of the voids in the anode layer is a value calculated from the anode layer of the all-solid-state battery after being subjected to initial discharging (the initially discharged all-solid-state battery). Initial discharging means initial discharging of the all-solid-state battery which is carried out after the all-solid-state battery is assembled and initially charged. Also in the disclosed embodiments, since the anode layer does not include an anode current collector, the volume of the anode current collector has no influence on the percentage of the voids in the anode layer.

The method for calculating the percentage of the voids is not particularly limited. For example, it can be calculated by "3D-SEM".

The details are as follows. For the initially discharged all-solid-state battery, a photograph of the top view of a part of the battery (e.g., a photograph 5 μm×5 μm in size), which is also a photograph of the surface of the anode layer in the part, is taken. Then, the anode layer surface is abraded by ion beam irradiation and photographed again. The anode layer surface is repeatedly abraded by ion beam irradiation and photographed, thereby obtaining 2D photographs of the anode layer surface. Then, 2D regions shown in the 2D photographs are read, and the areas of voids present in the 2D regions are calculated and integrated, thereby obtaining the volume of the voids in the resulting 3D region. Then, the percentage of the voids can be calculated by calculating the percentage of the volume of the voids to the whole volume of the 3D region.

As the conductive material, examples include, but are not limited to, carbonaceous materials such as Acetylene Black and Ketjen Black, fibrous carbons such as carbon fiber, and metal materials. From the viewpoint of better contact between the particles, the conductive material may be a fibrous carbon.

The content of the conductive material in the anode layer is not particularly limited. For example, when the total volume of the anode layer is determined as 100 vol %, the content may be from 0 vol % to 16 vol %.

The binder is not particularly limited. As the binder, examples include, but are not limited to, butadiene rubber (BR), polyvinylidene fluoride (PVdF) and styrene-butadiene rubber (SBR).

The content of the binder in the anode layer is not particularly limited. For example, when the total volume of the anode layer is determined as 100 vol %, the content may be from 0.5 vol % to 10 vol %.

The thickness of the anode layer is not particularly limited. For example, it may be from 10 μm to 100 μm, and it may be from 10 μm to 50 μm.

The method for producing the anode layer is not particularly limited. For example, the anode layer may be produced by the following method.

First, an anode active material and a solid electrolyte are prepared.

Then, the anode active material and the solid electrolyte are mixed to obtain a mixture.

The mixture is subjected to press molding to obtain a molded product. In the press molding, the press pressure applied to the mixture is not particularly limited. For example, it may be from 0.7 ton/cm$^2$ to 1.4 ton/cm$^2$ (≈from 68.6 MPa to 137.2 MPa).

The solid electrolyte is dissolved in an organic solvent to prepare a solution. The molded product is impregnated with the solution by applying the solution to the surface of the molded product.

Then, the solution in the molded product is dried, thereby obtaining an anode mixture.

The content of the solid electrolyte in the solution is not particularly limited. It may be from 2.4 mass % to 10 mass %. As the organic solvent, a volatile solvent in which the solid electrolyte can be dissolved, such as ethanol, may be used.

Then, an anode layer with desired voids is obtained by pressing the anode mixture. The press pressure applied in the pressing is not particularly limited. For example, it may be from 0.7 ton/cm$^2$ to 1.4 ton/cm$^2$ (≈from 68.6 MPa to 137.2 MPa).

The anode layer may be produced under an inert gas atmosphere such as argon gas.

The percentage of the voids in the anode layer (the percentage of the voids surrounded by the solid electrolyte in the anode layer) can be controlled by, for example, the press pressure applied to the anode mixture in the anode layer formation, and the content of the solid electrolyte in the solution that will be applied to the surface of the molded product.

The solution prepared by dissolving the solid electrolyte in the organic solvent, such as ethanol, is poured into the molded product. As a result, the volume of the molded product increases by the volume of the solution. Then, the organic solvent contained in the molded product is dried to be evaporated. Therefore, it is presumed that the solid electrolyte region including the desired voids surrounded by the solid electrolyte, is formed.

The anode current collector functions to collect current from the anode layer.

As the material for the anode current collector, examples include, but are not limited to, metal materials such as SUS, Ni, Cr, Au, Pt, Al, Fe, Ti, Zn and Cu.

As the form of the anode current collector, examples include, but are not limited to, a foil form, a plate form and a mesh form.

The anode may further comprise an anode lead that is connected to the anode current collector.

The cathode comprises at least the cathode layer. As needed, it further comprises a cathode current collector.

The cathode layer contains at least a cathode active material. As needed, it contains a conductive material, a binder, and a solid electrolyte.

As the cathode active material, conventionally known materials may be used. When the all-solid-state battery is a lithium battery, for example, an elemental lithium, a lithium alloy and a lithium-containing metal oxide may be used. As the lithium alloy, examples include, but are not limited to, an In—Li alloy. As the lithium-containing metal oxide, examples include, but are not limited to, layered rock salt-type active materials such as $LiCoO_2$, $LiNiO_2$, $LiVO_2$ and $LiNi_{1/3}Co_{1/3}Mn_{1/3}O_2$, spinel-type active materials such as $LiMn_2O_4$ and $Li(Ni_{0.5}Mn_{1.5})O_4$, and olivine-type active materials such as $LiFePO_4$, $LiMnPO_4$, $LiNiPO_4$ and $LiCoPO_4$.

The form of the cathode active material is not particularly limited. As the form, examples include, but are not limited to, a particulate form and a plate form.

The cathode active material may comprise such a coating layer that the surface of the cathode active material is coated with the solid electrolyte.

The method for coating the surface of the cathode active material with the solid electrolyte, is not particularly limited. As the method, examples include, but are not limited to, the following method: the cathode active material is coated with the solid electrolyte (e.g., $LiNbO_3$) in the air environment by use of a tumbling/fluidizing coater (manufactured by Powrex Corporation) and the cathode active material coated with the solid electrolyte is fired in the air environment. The examples also include, but are not limited to, a sputtering method, a sol-gel method, an electrostatic spraying method and a ball milling method.

The solid electrolyte used to form the coating layer may be a substance which has lithium ion conductivity and which is not fluidized and keeps the coating layer form even when it is brought into contact with an active material or solid electrolyte. As the solid electrolyte, examples include, but are not limited to, $LiNbO_3$, $Li_4Ti_5O_{12}$ and $Li_3PO_4$.

In addition, as the solid electrolyte used in the cathode layer, those exemplified below as the solid electrolyte of the below-described solid electrolyte layer, may be used.

As the conductive material and binder used in the cathode layer, those exemplified above as the conductive material and binder of the anode layer, may be used.

The thickness of the cathode layer is not particularly limited. For example, it may be from 10 μm to 250 μm, or it may be from 20 μm to 200 μm.

The content of the cathode active material in the cathode layer is not particularly limited. For example, when the total volume of the cathode layer is determined as 100 vol %, it may be from 50 vol % to 100 vol %.

The method for forming the cathode layer is not particularly limited. As the method, examples include, but are not limited to, pressure-forming a powdered cathode material containing the cathode active material and, as needed, other component.

The cathode current collector functions to collect current from the cathode layer.

As the material for the cathode current collector, those exemplified above as the material for the anode current collector, may be used.

As the form of the cathode current collector, those exemplified above as the form of the anode current collector, may be used.

The cathode may further comprise a cathode lead that is connected to the cathode current collector.

The solid electrolyte layer contains at least a solid electrolyte. As needed, it may contain a binder, etc.

As the solid electrolyte used in the solid electrolyte layer, examples include, but are not limited to, oxide- and sulfide-based solid electrolytes having high Li ion conductivity. The solid electrolyte may be a sulfide-based solid electrolyte.

As the sulfide-based solid electrolyte, those exemplified above as the sulfide-based solid electrolyte of the anode layer, may be used.

As the oxide-based solid electrolyte, examples include, but are not limited to, $Li_{6.25}La_3Zr_2Al_{0.25}O_{12}$, $Li_3PO_4$ and $Li_{3+x}PO_{4-x}N_x$(LiPON). As the sulfide-based solid electrolyte, examples include, but are not limited to, $Li_7P_3S_{11}$, $Li_3PS_4$, $Li_8P_2S$, $Li_{13}GeP_3S_{16}$ and $Li_{10}GeP_2S_{12}$.

As the solid electrolyte, one or more kinds of solid electrolytes may be used. In the case of using two or more kinds of solid electrolytes, they may be mixed together, or they may be formed into layers to obtain a multi-layered structure.

The proportion of the solid electrolyte in the solid electrolyte layer is not particularly limited. For example, it may be 50 mass % or more, may be in a range of 60 mass % or more and 100 mass % or less, may be in a range of 70 mass % or more and 100 mass % or less, or may be 100 mass %.

As the method for forming the solid electrolyte layer, examples include, but are not limited to, pressure-forming a powdered solid electrolyte material containing the solid electrolyte and, as needed, other component. In the case of pressure-forming the powdered solid electrolyte material, generally, a press pressure of about 1 MPa or more and about 400 MPa or less is applied.

As the binder used in the solid electrolyte layer, those exemplified above as the binder of the anode layer, may be used.

In general, the thickness of the solid electrolyte layer is about 0.1 μm or more and about 1 mm or less.

In the disclosed embodiments, the all-solid-state battery is a concept that encompasses an initially discharged state.

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin.

As the all-solid-state battery, examples include, but are not limited to, a lithium battery, a sodium battery, a magnesium battery and a calcium battery. The all-solid-state battery may be a lithium battery.

As the form of the all-solid-state battery, examples include, but are not limited to, a coin form, a laminate form, a cylindrical form and a square form.

The method for producing the all-solid-state battery of the disclosed embodiments, is not particularly limited and may be a conventionally known method.

For example, the solid electrolyte layer is formed by pressure-forming the powdered solid electrolyte material containing the solid electrolyte. Next, the above-described anode layer production method is carried out on one surface of the solid electrolyte layer, thereby obtaining the anode layer. Then, the cathode layer is obtained by pressure-forming the powdered cathode material on the other surface of the solid electrolyte layer. A cathode layer-solid electrolyte layer-anode layer assembly thus obtained, is initially charged and discharged, thereby producing the all-solid-state battery.

In this case, the press pressure applied in the pressure-forming of the powdered solid electrolyte material and the powdered cathode material, is generally about 1 MPa or more and about 600 MPa or less.

The pressing method is not particularly limited. As the method, examples include, but are not limited to, applying pressure by use of a plate press machine, a roll press machine, etc.

EXAMPLES (Synthesis of Sulfide-Based Solid Electrolyte)

In a glove box under an argon atmosphere, $Li_2S$ (manufactured by Nippon Chemical Industrial Co., Ltd.) of 0.7656 g and $P_2S_5$ (manufactured by Aldrich) of 1.2344 g were weighed out as starting materials and mixed for 5 minutes in an agate mortar. Then, 4 g of heptane was added to the mixture, thereby obtaining a raw material composition. Next, 1 g of the raw material composition and 80 zirconia balls (5 mm in diameter) were put in a zirconia pot (45 ml), and the pot was hermetically closed (under an argon atmosphere). This pot was installed in a planetary ball mill (product name: P7, manufactured by: Fritsch Japan Co., Ltd.) and subjected to mechanical milling at a plate rotational frequency of 500 rpm for 40 hours, thereby obtaining a powdered $Li_8P_2S_9$ as a sulfide-based solid electrolyte.

Example 1

[Cathode Mixture]

Lithium nickel cobalt manganate ($LiNi_{3/5}Co_{1/5}Mn_{1/5}O_2$) was used as a cathode active material. The cathode active material was surface-treated with $LiNbO_3$. Then, VGCF (trademark, manufactured by Showa Denko K. K.) of 0.460 mg and $Li_8P_2S_9$ of 3.53 mg were weighed out as a conductive material and a solid electrolyte, respectively, and they were mixed with 12.5 mg of the cathode active material to prepare a cathode mixture.

[Anode Mixture]

First, 2.45 mg of silicon powder as an anode active material, 1.80 mg of $Li_8P_2S_9$ as a solid electrolyte, 0.18 mg of VGCF as a conductive material, and 1.6 mg of a binder dissolved at a concentration of 5 mass % in an organic solvent, the binder containing 75 mol % of PVdF, were mixed to obtain a mixture.

Next, the mixture was uniformly packed in a 1 $cm^2$ ceramic mold and subjected to press molding at 0.5 ton/$cm^2$ ($\approx$49 MPa) to obtain a molded product.

The thus-obtained molded product was removed from the mold. A solution in which $Li_8P_2S_9$ as the solid electrolyte was dissolved at a concentration of 6.0 mass % in ethanol, was applied to the surface of the molded product and dried for one hour at normal temperature, thereby obtaining an anode mixture.

[All-Solid-State Battery]

$Li_8P_2S_9$ of 15 mg was weighed out as a solid electrolyte, put in a 1 $cm^2$ ceramic mold, and pressed at 1 ton/$cm^2$ ($\approx$98 MPa) to produce a solid electrolyte layer.

The cathode mixture produced above was disposed on one surface of the solid electrolyte layer. They were pressed at 1 ton/$cm^2$ ($\approx$98 MPa) to produce a cathode layer. An aluminum foil was used as a cathode current collector and disposed on a surface of the cathode layer, which is opposite to the surface on which the solid electrolyte layer was formed, thereby obtaining a cathode.

The anode mixture produced above was disposed on the other surface of the solid electrolyte layer. They were pressed at 1.3 ton/$cm^2$ ($\approx$127.4 MPa) to produce an anode layer. A copper foil was used as an anode current collector and disposed on a surface of the anode layer, which is opposite to the surface on which the solid electrolyte layer was formed, thereby obtaining an anode.

An all-solid-state battery was obtained by the above process.

Examples 2 to 8 and Comparative Examples 1 to 6

All-solid-state batteries were obtained in the same manner as Example 1, except that the content of the solid electrolyte in the ethanol, which is described above in "Anode mixture", and the press pressure applied to the anode mixture in the anode layer production, which is described above in "All-solid-state battery", were changed as shown in Table 1.

[Charge-Discharge Test]

The all-solid-state batteries of Examples 1 to 8 and Comparative Examples 1 to 6 were subjected to a charge-discharge test.

For evaluation, each all-solid-state battery was confined by a confining jig at a confining pressure of 0.8 MPa.

As initial charging, each battery was charged with CC/CV at 0.3 mA to 4.35 V.

The highest inner pressure value of the battery during charging, was used for effect measurement.

Then, as initial discharging, each battery was discharged with CC/CV at 0.5 mA to 2.5 V.

[Pressure Value]

The confining pressure was adjusted by disposing a load cell between confining plates.

During charging, pressure increase was measured through the load cell.

Tables 1 to 3 show the pressures on the jig of Examples 1 to 8 and Comparative Examples 1 to 6, compared to Example 2 as the baseline (100), during charging.

Then, DC-IR measurement was carried out.

[Resistance Value]

The DC-IR measurement was carried out as follows: a resistance value was obtained from a voltage decrease that was shown when voltage was controlled to 3.5 V and then a current of 8.5 mA was applied for 5 seconds.

Tables 1 to 3 show the relative resistance values of Examples 1 to 8 and Comparative Examples 1 to 6, compared to Example 2 as the baseline (100).

[Percentage of Voids]

The total percentage of voids in the anode layer, the percentage of voids in the solid electrolyte region (the percentage of the voids surrounded by the solid electrolyte in the solid electrolyte region) and the percentage of voids in the anode layer (the percentage of the voids surrounded by the solid electrolyte in the anode layer) were obtained by 3D-SEM.

The 3D-SEM was carried out as follows: a plan-view SEM image of a micro region (5 μm×5 μm in size) of the anode layer of the all-solid-state battery, was measured. Then, the micro region of the anode layer surface was abraded by ion bean irradiation, and another plan-view SEM image of the micro region was measured and observed. This process was repeated and the measurement of the plan-view SEM images was carried out until the micro region of the anode layer surface was abraded to a depth of 5 μm.

Then, the areas of the voids shown in the plan-view SEM images were calculated and integrated, thereby obtaining the volume of the voids in the micro region.

Then, the percentage of voids was calculated from the percentage of the volume of the voids to the volume of the whole micro region.

The results are shown in Tables 1 to 3.

a range of from 3.4 vol % to 29.6 vol %, there are a confining pressure decreasing effect and a battery resistance value decreasing effect, and they are in excellent balance.

Also, it is clear that the relative resistance value is worse in Comparative Examples 1 to 6 than in Example 2, and Comparative Examples 1 to 6 have a poor balance between the confining pressure decreasing effect and the battery resistance value decreasing effect.

From the results of Comparative Examples 2 to 5, it is clear that when the percentage of the voids in the anode layer (the percentage of the voids surrounded by the solid electrolyte in the anode layer) is controlled to a low value of from 0.9 vol % to 2.3 vol % and the total percentage of the voids in the anode layer is increased from 3 vol % to 45 vol %, the confining pressure of the battery tends to decrease as the total percentage of the voids in the anode layer increases; meanwhile, the resistance value of the battery increases when the total percentage of the voids in the anode layer is more than 40 vol %.

From the result of Comparative Example 1, it is clear that since the pressure on the jig and the relative resistance value are significantly higher in Comparative Example 1 than in Example 2, even though the total percentage of the voids in the anode layer is from 10 vol % to 15 vol %, the confining pressure decreasing effect and the battery resistance value decreasing effect are not obtained when the percentage of the voids in the anode layer (the percentage of the voids

TABLE 1

| | Total percentage (vol %) of voids in anode layer | Percentage (vol %) of voids surrounded by solid electrolyte in SE region | Percentage (vol %) of voids surrounded by solid electrolyte in anode layer | Pressure on jig (Based on Example 2) | Relative resistance value (Based on Example 2) | SE content (mass %) in ethanol | Press pressure (ton/cm²) applied in anode layer production |
|---|---|---|---|---|---|---|---|
| Comparative Example 1 | 10 to 15 | 1 or less | 0.2 | 130 | 200 | 0.0 | 6.0 |
| Comparative Example 2 | 3 | 30 | 0.9 | 114 | 106 | 15.5 | 1.6 |
| Comparative Example 3 | 45 | 3 | 1.4 | 76 | 132 | 55.0 | 0.7 |
| Comparative Example 4 | 3 | 70 | 2.1 | 108 | 104 | 3.5 | 1.5 |
| Comparative Example 5 | 15 | 15 | 2.3 | 108 | 104 | 40.0 | 1.0 |
| Example 1 | 5 | 67 | 3.4 | 97 | 98 | 6.0 | 1.3 |
| Example 2 | 15 | 40 | 6.0 | 100 | 100 | 25.0 | 1.0 |
| Example 3 | 15 | 55 | 8.3 | 84 | 97 | 7.5 | 1.0 |
| Example 4 | 15 | 65 | 9.8 | 80 | 97 | 5.0 | 1.0 |
| Example 5 | 15 | 80 | 12.0 | 68 | 91 | 2.5 | 1.4 |
| Example 6 | 38 | 52 | 19.8 | 78 | 96 | 10.0 | 0.7 |
| Example 7 | 38 | 68 | 25.8 | 71 | 94 | 5.5 | 0.75 |
| Example 8 | 38 | 78 | 29.6 | 65 | 92 | 2.4 | 0.75 |
| Comparative Example 6 | 45 | 69 | 31.1 | 70 | 107 | 3.9 | 0.7 |

[Results of Charge-Discharge Test]

According to Table 1, the relative resistance value is lower in Examples 1 to 8 than in Comparative Examples 1 to 6. Therefore, it is found that when the percentage of the voids in the anode layer (the percentage of the voids surrounded by the solid electrolyte in the anode layer) is in surrounded by the solid electrolyte in the anode layer) is as small as 0.2 vol %. Therefore, it is clear that the confining pressure decreasing effect and the battery resistance value decreasing effect are not obtained just by controlling the total percentage of the voids in the anode layer in a range of from 10 vol % to 15 vol %.

TABLE 2

| | Total percentage (vol %) of voids in anode layer | Percentage (vol %) of voids surrounded by solid electrolyte in SE region | Percentage (vol %) of voids surrounded by solid electrolyte in anode layer | Pressure on jig (Based on Example 2) | Relative resistance value (Based on Example 2) | SE content (mass %) in ethanol | Press pressure (ton/cm²) applied in anode layer production |
|---|---|---|---|---|---|---|---|
| Comparative Example 5 | 15 | 15 | 2.3 | 108 | 104 | 40.0 | 1.0 |
| Example 2 | 15 | 40 | 6.0 | 100 | 100 | 25.0 | 1.0 |
| Example 3 | 15 | 55 | 8.3 | 84 | 97 | 7.5 | 1.0 |

TABLE 2-continued

|  | Total percentage (vol %) of voids in anode layer | Percentage (vol %) of voids surrounded by solid electrolyte in SE region | Percentage (vol %) of voids surrounded by solid electrolyte in anode layer | Pressure on jig (Based on Example 2) | Relative resistance value (Based on Example 2) | SE content (mass %) in ethanol | Press pressure (ton/cm$^2$) applied in anode layer production |
|---|---|---|---|---|---|---|---|
| Example 4 | 15 | 65 | 9.8 | 80 | 97 | 5.0 | 1.0 |
| Example 5 | 15 | 80 | 12.0 | 88 | 91 | 2.5 | 1.4 |
| Example 6 | 38 | 52 | 19.8 | 78 | 96 | 10.0 | 0.7 |
| Example 7 | 38 | 68 | 25.8 | 71 | 94 | 5.5 | 0.75 |
| Example 8 | 38 | 78 | 29.6 | 65 | 92 | 2.4 | 0.75 |

From the results of Examples 2 to 5 and Comparative Example 5 shown in Table 2, it was confirmed that the balance between the confining pressure decreasing effect and the battery resistance value decreasing effect is improved by controlling the total percentage of the voids in the anode layer to 15 vol % and increasing the percentage of the voids in the anode layer (the percentage of the voids surrounded by the solid electrolyte in the anode layer) to 2.3 vol % (Comparative Example 5), 6.0 vol % (Example 2), 8.3 vol % (Example 3), 9.8 vol % (Example 4) and 12.0 vol % (Example 5). Therefore, it is presumed that as long as the percentage of the voids in the anode layer (the percentage of the voids surrounded by the solid electrolyte in the anode layer) is in a range of from 6.0 vol % to 12.0 vol %, the expansion of the anode active material during battery charging, is easily absorbed, and the contact (interface) between the anode active material and the solid electrolyte is increased.

From the results of Examples 2 to 5 and Comparative Example 5, it was also confirmed that the balance between the confining pressure decreasing effect and the battery resistance value decreasing effect is improved by controlling the total percentage of the voids in the anode layer to 15 vol % and increasing the percentage of the voids in the solid electrolyte region (the percentage of the voids surrounded by the solid electrolyte in the solid electrolyte region) to 15 vol % (Comparative Example 5), 40 vol % (Example 2), 55 vol % (Example 3), 65 vol % (Example 4) and 80 vol % (Example 5). Therefore, it was confirmed that as long as the percentage of the voids in the solid electrolyte region (the percentage of the voids surrounded by the solid electrolyte in the solid electrolyte region) is in a range of from 40 vol % to 80 vol %, the confining pressure decreasing effect and the battery resistance value decreasing effect are in excellent balance.

From the results of Examples 6 to 8, it was confirmed that the balance between the confining pressure decreasing effect and the battery resistance value decreasing effect is improved by controlling the total percentage of voids in the anode layer to 38% and increasing the percentage of the voids in the anode layer (the percentage of the voids surrounded by the solid electrolyte in the anode layer) to 19.8 vol % (Example 6), 25.8 vol % (Example 7) and 29.6 vol % (Example 8). Therefore, it was confirmed that as long as the percentage of the voids in the anode layer (the percentage of the voids surrounded by the solid electrolyte in the anode layer) is in a range of from 19.8 vol % to 29.6 vol %, the confining pressure decreasing effect and the battery resistance value decreasing effect are in excellent balance.

TABLE 3

|  | Total percentage (vol %) of voids in anode layer | Percentage (vol %) of voids surrounded by solid electrolyte in SE region | Percentage (vol %) of voids surrounded by solid electrolyte in anode layer | Pressure on jig (Based on Example 2) | Relative resistance value (Based on Example 2) | SE content (mass %) in ethanol | Press pressure (ton/cm$^2$) applied in anode layer production |
|---|---|---|---|---|---|---|---|
| Comparative Example 4 | 3 | 70 | 2.1 | 108 | 104 | 3.5 | 1.5 |
| Example 1 | 5 | 67 | 3.4 | 97 | 98 | 6.0 | 1.3 |
| Example 4 | 15 | 65 | 9.8 | 80 | 97 | 5.0 | 1.0 |
| Example 7 | 38 | 68 | 25.8 | 71 | 94 | 5.5 | 0.75 |
| Comparative Example 6 | 45 | 69 | 31.1 | 70 | 107 | 3.9 | 0.7 |

From the results of Examples 1, 4 and 7 and Comparative Examples 4 and 6 shown in Table 3, it was confirmed that as long as the total percentage of the voids in the anode layer is in a range of from 5 vol % to 38 vol %, the balance between the confining pressure decreasing effect and the battery resistance value decreasing effect is improved by controlling the percentage of the voids in the solid electrolyte region (the percentage of the voids surrounded by the solid electrolyte in the solid electrolyte region) in a range of from 65 vol % to 70 vol % and increasing the total percentage of the voids in the anode layer to 3 vol % (Comparative Example 4), 5 vol % (Example 1), 15 vol % (Example 4), 38 vol % (Example 7) and 45 vol % (Comparative Example 6).

From the results of Examples 1, 4 and 7 and Comparative Examples 4 and 6, it was also confirmed that as long as the percentage of the voids in the anode layer (the percentage of the voids surrounded by the solid electrolyte in the anode layer) is in a range of from 3.4 vol % to 25.8 vol %, the balance between the confining pressure decreasing effect and the battery resistance value decreasing effect is improved by controlling the percentage of the voids in the solid electrolyte region (the percentage of the voids surrounded by the solid electrolyte in the solid electrolyte region) in a range of from 65 vol % to 70 vol % and increasing the percentage of the voids in the anode layer (the percentage of the voids surrounded by the solid electrolyte in the anode layer) to 2.1 vol % (Comparative Example 4), 3.4 vol % (Example 1), 9.8 vol % (Example 4), 25.8 vol % (Example 7) and 31.1 vol % (Comparative Example 6).

From the above results, it was proved that the all-solid-state battery comprising such an anode layer that the percentage of the voids in the anode layer (the percentage of the voids surrounded by the solid electrolyte in the anode layer) is in a range of from 3.4 vol % to 29.6 vol %, has an excellent balance between the confining pressure decreasing effect and the battery resistance value decreasing effect.

REFERENCE SIGNS LIST

11. Solid electrolyte layer
12. Cathode layer
13. Anode layer
14. Cathode current collector
15. Anode current collector
16. Cathode
17. Anode
21. Solid electrolyte particle
22. Anode active material particle
23. Solid electrolyte region
24. Void surrounded by solid electrolyte
25. Void between anode active material and solid electrolyte
100. All-solid-state battery

The invention claimed is:

1. An all-solid-state battery comprising a cathode layer, an anode layer, and a solid electrolyte layer disposed between the cathode layer and the anode layer,
   wherein the anode layer comprises an anode active material that contains at least one Si-based material selected from the group consisting of Si and a Si alloy, and a solid electrolyte that contains a sulfide-based solid electrolyte;
   wherein a void surrounded by the solid electrolyte is present in at least a region formed by the solid electrolyte in the anode layer; and
   wherein, when a total volume of the anode layer is determined as 100 vol %, a percentage of the voids surrounded by the solid electrolyte in the anode layer, is 3.4 vol % or more and 29.6 vol % or less.

2. The all-solid-state battery according to claim 1, wherein the anode layer further comprises a fibrous carbon as a conductive material.

3. The all-solid-state battery according to claim 1, wherein, when the total volume of the anode layer is determined as 100 vol %, a percentage of all voids present in the anode layer, is 5 vol % or more and 38 vol % or less.

4. The all-solid-state battery according to claim 1, wherein, when a total volume of the region formed by the solid electrolyte in the anode layer is determined as 100 vol %, a percentage of the voids surrounded by the solid electrolyte in the region, is 40 vol % or more and 80 vol % or less.

5. The all-solid-state battery according to claim 1, wherein, when the total volume of the anode layer is determined as 100 vol %, the percentage of the voids surrounded by the solid electrolyte in the anode layer, is 8.3 vol % or more and 29.6 vol % or less.

6. The all-solid-state battery according to claim 1, wherein, when the total volume of the anode layer is determined as 100 vol %, the percentage of all voids present in the anode layer is 15 vol % or more and 38 vol % or less.

7. The all-solid-state battery according to claim 1, wherein, when the total volume of the region formed by the solid electrolyte and contained in the anode layer is determined as 100 vol %, the percentage of the voids surrounded by the solid electrolyte in the region, is 52 vol % or more and 80 vol % or less.

* * * * *